United States Patent
Yamanaka et al.

(10) Patent No.: US 9,707,969 B2
(45) Date of Patent: Jul. 18, 2017

(54) VEHICLE CONTROL SYSTEM

(71) Applicant: TOYOTA JIDOSHA KABUSHIKI KAISHA, Toyota-shi (JP)

(72) Inventors: Satoshi Yamanaka, Toyota (JP); Takahiro Yokokawa, Toyota (JP); Yoshio Ito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 155 days.

(21) Appl. No.: 14/438,355

(22) PCT Filed: Oct. 30, 2012

(86) PCT No.: PCT/JP2012/077988
§ 371 (c)(1),
(2) Date: Apr. 24, 2015

(87) PCT Pub. No.: WO2014/068656
PCT Pub. Date: May 8, 2014

(65) Prior Publication Data
US 2015/0274172 A1  Oct. 1, 2015

(51) Int. Cl.
*B60W 30/192* (2012.01)
*F16D 48/06* (2006.01)
(Continued)

(52) U.S. Cl.
CPC .......... *B60W 30/192* (2013.01); *B60W 10/02* (2013.01); *B60W 10/023* (2013.01);
(Continued)

(58) Field of Classification Search
None
See application file for complete search history.

(56) References Cited

U.S. PATENT DOCUMENTS

| | | |
|---|---|---|
| 2010/0167874 A1 | 7/2010 | Shirasaka et al. |
| 2011/0257856 A1 | 10/2011 | Tsutsui et al. |
| 2012/0172175 A1* | 7/2012 | Nedorezov ........... F02D 41/065 |
| | | 477/169 |

FOREIGN PATENT DOCUMENTS

| | | |
|---|---|---|
| DE | 10 2011 087 950 A1 | 7/2012 |
| JP | 11-325232 A | 11/1999 |

(Continued)

OTHER PUBLICATIONS

International Search Report issued Dec. 11, 2012 in PCT/JP2012/077988 filed Oct. 30, 2012.

*Primary Examiner* — Jacob S Scott
(74) *Attorney, Agent, or Firm* — Oblon, McClelland, Maier & Neustadt, L.L.P.

(57) ABSTRACT

A vehicle control system configured to carry out an energy saving control is provided. The vehicle control system is applied to a vehicle having an engine, a torque converter, a transmission and a clutch device selectively connecting a turbine runner to the transmission. The vehicle control system executes the energy saving control by controlling both an operating condition of the engine and an engagement condition of the clutch device or only the engagement condition of the clutch device. The vehicle control system comprises a clutch control means configured to increase the torque transmitting capacity of the clutch device using an increasing amount of a speed of the turbine runner as a target value, when bringing the clutch device into engagement being in disengagement during execution of the energy saving control.

4 Claims, 9 Drawing Sheets (51) Int. Cl.
*B60W 10/02* (2006.01)
*B60W 30/20* (2006.01)
*B60W 10/06* (2006.01)
*F16H 45/00* (2006.01)
*F16H 61/04* (2006.01)

(52) U.S. Cl.
CPC ............ *B60W 10/06* (2013.01); *B60W 30/20* (2013.01); *F16D 48/06* (2013.01); *F16H 45/00* (2013.01); *B60W 2030/206* (2013.01); *F16D 2500/5085* (2013.01); *F16D 2500/50236* (2013.01); *F16D 2500/50287* (2013.01); *F16D 2500/50676* (2013.01); *F16D 2500/50883* (2013.01); *F16D 2500/70422* (2013.01); *F16D 2500/70452* (2013.01); *F16D 2500/70472* (2013.01); *F16H 61/04* (2013.01); *F16H 2045/005* (2013.01); *F16H 2312/14* (2013.01); *Y10T 477/735* (2015.01)

(56) References Cited

FOREIGN PATENT DOCUMENTS

| | | |
|---|---|---|
| JP | 2010-151226 A | 7/2010 |
| JP | 2012-149710 A | 8/2012 |
| WO | 2011/125612 A1 | 10/2011 |

\* cited by examiner

VEHICLE CONTROL SYSTEM

TECHNICAL FIELD

The present invention relates to a vehicle control system for controlling a clutch device connecting a prime mover such as an engine to a transmission, and more specifically, to a vehicle control system for controlling a torque transmitting capacity of the clutch device in accordance with a torque applied thereto through a torque converter.

BACKGROUND ART

A required driving force for propelling a vehicle is varied during running. Basically, an energy efficiency of an engine of the vehicle would be degraded if operated at an operating point deviated away from an optimum operating point. In the conventional vehicles, therefore, a transmission is disposed on an output side of the engine to improve the energy efficiency by adjusting the driving force in accordance with a speed ratio of the transmission. To this end, for example, a geared transmission adapted to change a gear stage stepwise, and a continuously variable transmission adapted to vary a speed ratio continuously have been used in the conventional vehicles. In the vehicle having the transmission, a torque converter is disposed between the engine and the transmission to allow the engine to rotate even when the vehicle stops.

As widely known in the art, the torque converter is a fluid coupling adapted to transmit torque by rotating a turbine runner by a spiral flow created by a pump impeller. Given that a speed difference between the pump impeller and the turbine runner is large, that is, a speed ratio is small, oil flow returning from the turbine runner to the pump impeller is altered by a stator interposed therebetween. Consequently, torque transmitted through the torque converter is multiplied to establish a creep torque when the speed ratio is small. That is, a torque delivered to the transmission disposed on the output side of the torque converter is altered in accordance with the speed ratio of the torque converter. Therefore, hydraulic pressures governing torque transmitting capacities of clutches and brakes of the transmission are controlled in accordance with an operating state of the torque converter.

For example, Japanese Patent Laid-Open No. 11-325232 describes a hydraulic control device and method of a transmission having the torque converter and clutch devices. According to the teachings of Japanese Patent Laid-Open No. 11-325232, an engagement state of at least one of the clutches of the automatic transmission is hydraulically controlled to carry out a speed change operation. To this end, specifically, an output torque of the engine is calculated based on a parameter representing an engine load and an engine speed, and a required transmission torque of the clutch is calculated based on the calculated engine torque and a parameter representing the engine speed. Then, a command value of the hydraulic pressure applied to the clutch is determined based on the calculated transmission torque.

The automatic transmission taught by Japanese Patent Laid-Open No. 11-325232 is provided with the torque converter connected to an output shaft of the engine. According to the teachings of Japanese Patent Laid-Open No. 11-325232, a torque ratio of the torque converter is calculated based on the engine speed and an output shaft speed of the torque converter (i.e., a turbine speed), and an output shaft torque of the torque converter (i.e., a turbine torque) is calculated based on the calculated torque ratio and an output torque of the engine. The required transmission torque of the clutch may also be calculated based on the calculated turbine torque and the turbine speed.

In recent years, in order to improve fuel efficiency and to reduce emission, a stop and start control (abbreviated as the "S & S" control hereinafter) and a coasting control have been developed. For example, under the S & S control, the engine is automatically stopped when vehicle speed is zero or when an accelerator pedal is released, and the engine is automatically restarted when the accelerator pedal is depressed or a brake pedal is released.

However, during execution of the S & S control, an output torque of the engine would be fluctuated when stopping or starting the engine automatically. In order to prevent propagation of such fluctuation in the engine torque to a powertrain of the vehicle, a clutch device disposed between the engine and the powertrain is brought into disengagement. That is, an actuation control of the clutch disposed between the engine and the powertrain is carried out in conjunction with the S & S control.

One example of such clutch control to be carried out in conjunction with the S & S control is described in Japanese Patent Laid-Open No. 2010-151226. According to the teachings of Japanese Patent Laid-Open No. 2010-151226, fluid is delivered promptly to the clutch when restarting the engine by an idle stop function so that the clutch is allowed to be brought into engagement promptly. To this end, specifically, the vehicle drive unit taught by Japanese Patent Laid-Open No. 2010-151226 is comprised of an oil pump driven by a prime mover to generate hydraulic pressure, a clutch that is hydraulically controlled to transmit torque from prime mover to an output shaft, a hydraulic pressure controller that controls the hydraulic pressure generated by the oil pump at a predetermined pressure to engage the clutch, an accumulator that accumulates the hydraulic pressure generated by the oil pump, and an open/close valve that switches between a blocked state and a communicated state of an oil passage connecting the accumulator and the clutch. The hydraulic pressure accumulated in the accumulator is supplied to the clutch when or before the oil pump is activated.

The vehicle drive unit taught by Japanese Patent Laid-Open No. 2010-151226 is further provided with a clutch pressure control valve that controls hydraulic pressure for operating the clutch, a clutch control valve that is provided in a first oil passage between the clutch pressure control valve and the clutch, and that controls hydraulic pressure in an engagement state between full engagement and disengagement of the clutch, a second oil passage that bypasses the clutch control valve and that is arranged parallel to the first oil passage, and a shift valve that connects, to an oil passage connected to the clutch, the first oil passage when controlling the engagement state between full engagement and disengagement of the clutch, and the second oil passage when not controlling the engagement state between full engagement and disengagement of the clutch. The accumulator is connected to an oil passage connecting the shift valve and the clutch through the open/close valve, and the second oil passage is provided with a one-way valve that allows oil to flow only in the direction from the oil pump to the shift valve.

According to the teachings of Japanese Patent Laid-Open No. 2010-151226, therefore, the hydraulic pressure stored in the accumulator is delivered to the clutch when activating the oil pump or before activating the oil pump. In this situation, since the engagement state between full engagement and disengagement of the clutch is not controlled, the oil passage connected to the clutch is communicated with the second oil passage by the shift valve, and the oil is prone to flow from the accumulator to the oil pump side through the second oil passage. However, since the second oil passage is provided with the one-way valve, the oil does not flow from the accumulator to the oil pump side through the second oil passage. For this reason, the hydraulic pressure from the accumulator is supplied only to the clutch, whereby the hydraulic pressure can be efficiently supplied from the accumulator to the clutch in a short period of time.

However, the clutch control may not be carried out properly in the vehicle using the automatic transmission having the torque converter as taught by Japanese Patent Laid-Open No. 11-325232 during execution of the above-mentioned S & S control or the coasting control for automatically stopping and starting the engine. Specifically, if the engine is stopped or restarted while keeping the clutch in engagement during execution of the S & S control, an abrupt change in an input torque to the powertrain from the transmission to drive wheels (i.e., a turbine torque) may result in vibrations and shocks. Especially, the input torque to the powertrain would be changed significantly when starting the engine thereby amplifying vibrations and shocks. In order to suppress such change in the input torque to the powertrain, according to the conventional art, the clutch is brought into engagement while slipping when restarting the engine.

For this purpose, according to the conventional art as taught by Japanese Patent Laid-Open No. 11-325232, a turbine speed that is easy to be detected is employed as a target control amount of the clutch during the slip engagement of the clutch. Specifically, while the clutch is causing a slip, a speed of an engagement element of the torque converter side is different from a speed of an engagement element of the transmission side. That is, the turbine speed may be different from the input speed of the transmission. Specifically, when the engine is started and an output torque thereof is wasted by the torque converter, such speed difference can be expressed as the following inequality: "engine speed>turbine speed>input speed".

If the vehicle is stopping or running at an extremely low speed and hence the input speed is low during causing a slip of the clutch based on a target control amount of the turbine speed, a difference between an actual turbine speed and a target turbine speed would not be significantly wide. However, if the S & S control or the coasting control is executed during running, the input speed would exceed the target turbine speed as expressed by the following inequality: "target turbine speed<input speed". In this case, the clutch would be brought into engagement before the turbine speed is increased sufficiently. If the clutch is brought into engagement before the turbine speed is increased sufficiently to be approximated to the input speed, the input torque would be changed abruptly to cause shocks to provide a driver with an uncomfortable feeling.

SUMMARY OF INVENTION

In view of the above-described technical problem, it is therefore an object of the present invention to provide a vehicle control system configured to bring a clutch device into engagement during execution of the S & S control or the coasting control without causing engagement shocks, in a vehicle having an automatic transmission with a torque converter.

The vehicle control system according to the present invention is applied to a vehicle comprising: an engine; a torque converter having a pump impeller to which torque of the engine is delivered, and a turbine runner from which the torque is outputted; a transmission that transmits the torque delivered from the turbine runner to drive wheels; and a clutch device that is disposed between the turbine runner and the transmission to selectively connect the torque converter to the transmission while changing a torque transmitting capacity thereof. The vehicle control system is configured to execute an energy saving control for reducing energy consumption of the vehicle by automatically controlling both an operating condition of the engine and an engagement condition of the clutch device or only the engagement condition of the clutch device. In order to achieve the above-explained objectives, according to the present invention, the vehicle control system is provided with a clutch control means that is configured to increase the torque transmitting capacity of the clutch device using an increasing amount of a speed of the turbine runner as a target value, when bringing the clutch device into engagement being in disengagement during execution of the energy saving control.

The energy saving control includes: a stop and start control for stopping the engine while bringing the clutch device into disengagement upon satisfaction of a predetermined stopping condition, and restarting the engine while bringing the clutch device into engagement upon satisfaction of a predetermined restarting condition; and a coasting control for allowing the vehicle to coast by bringing the clutch device into disengagement upon satisfaction of a predetermined starting condition, and terminating the coasting of the vehicle by bringing the clutch device into engagement upon satisfaction of a predetermined terminating condition.

The clutch control means may be configured to increase the target turbine speed to an input speed to the transmission rotated by the torque of the turbine runner delivered through the clutch device, and to increase the torque transmitting capacity of the clutch device in a manner such that the turbine speed is increased to achieve the target turbine speed, in case a difference between the input speed and the turbine speed remains constant over a predetermined period of time.

The clutch control means may also be configured to increase the target turbine speed to an input speed to the transmission rotated by the torque of the turbine runner delivered through the clutch device, and to increase the torque transmitting capacity of the clutch device in a manner such that the turbine speed is increased to achieve the target turbine speed, in case the input speed is higher than the turbine speed.

Thus, the vehicle control system according to the present invention is configured to execute the energy saving control such as the stop and start control and the coasting control in the vehicle in which the torque converter is disposed between the engine and the transmission, and the clutch device is disposed between the torque converter and the transmission. Specifically, during execution of the energy saving control, the vehicle control system brings the clutch device into engagement while increasing the torque transmitting capacity thereof using an increasing amount of a speed of the turbine runner as a target value. According to the present invention, therefore, an engagement shock of the clutch device and a resultant change in the output torque of the engine will not be transmitted to the transmission and the drive wheels through the torque converter and the clutch device. For this reason, the energy saving control such as the stop and start control and the coasting control can be carried out without providing uncomfortable feeling with the driver.

Optionally, the vehicle control system may be configured to promptly complete the engagement of the clutch device in case a difference between the input speed and the turbine speed is not reduced and remains constant over a predetermined period of time during execution of the energy saving control. To this end, specifically, the vehicle control system brings the clutch device into engagement in a manner to compulsory sweep up the turbine speed to the input speed. According to the present invention, therefore, the partial engagement of the clutch device while slipping resulting from the speed difference between the input speed and the turbine speed will not be continued over a long period of time so that the clutch device can be prevented from being damaged.

The vehicle control system may also be configured to promptly complete the engagement of the clutch device in case the input speed stays higher than the turbine speed during execution of the energy saving control. In this case, the vehicle control system brings the clutch device into engagement in a manner to compulsory sweep up the turbine speed to the input speed. According to the present invention, therefore, the partial engagement of the clutch device while slipping resulting from the speed difference between the input speed and the turbine speed will not be continued over a long period of time so that the clutch device can be prevented from being damaged.

DESCRIPTION OF THE PREFERRED EMBODIMENT(S)

Figure 1:
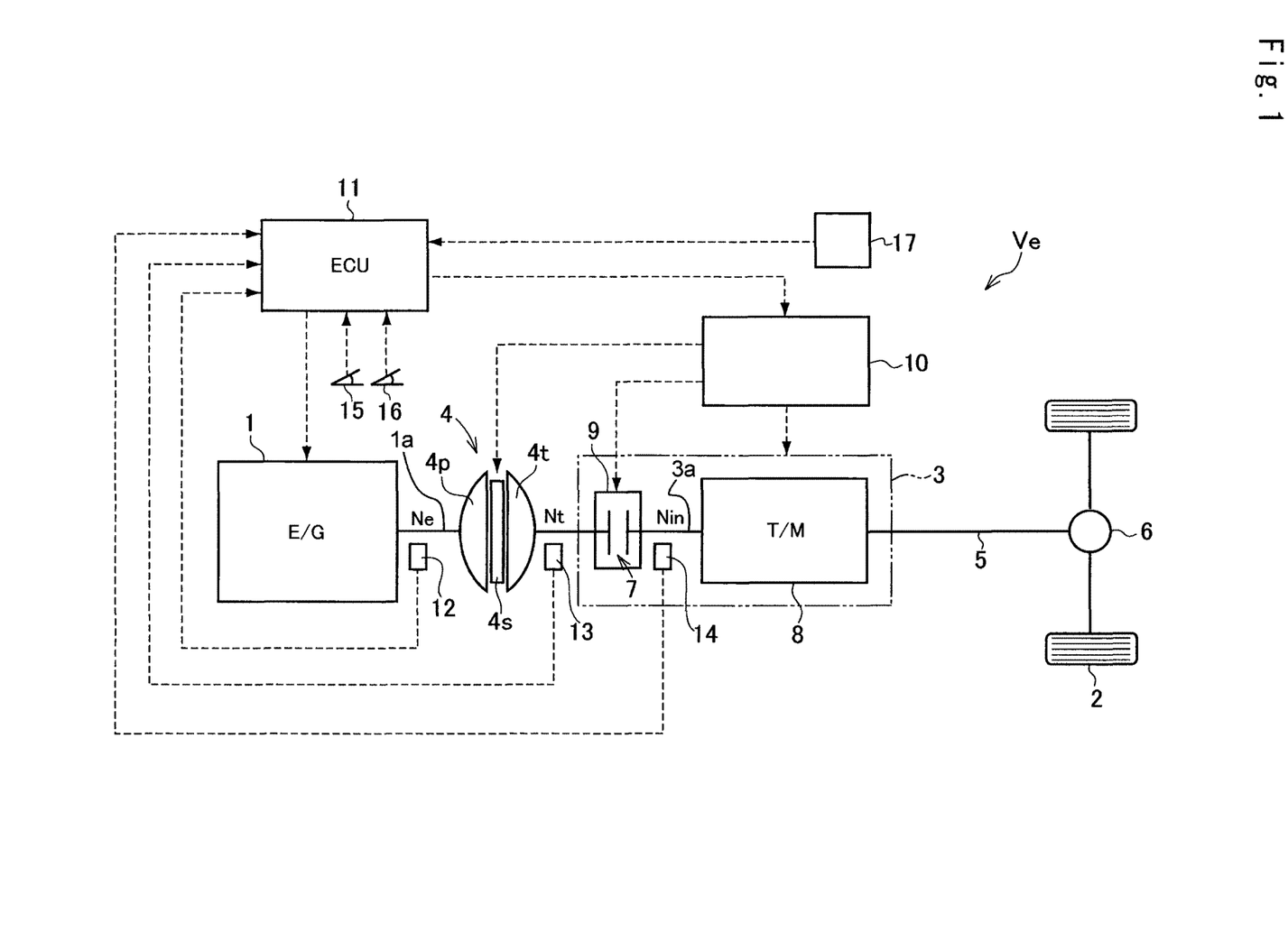
FIG. 1 is a schematic view showing an example of a powertrain and control system of a vehicle to which the present invention is applied.

Next, preferred examples of the hydraulic control system will be explained with reference to the accompanying drawings. FIG. 1 shows a powertrain and a control system of the vehicle to which the vehicle control system of the present invention is applied. In the vehicle Ve illustrated in FIG. 1, an automatic transmission 3 is connected to an output shaft 1a of an engine 1 through a torque converter 4. An output side of the transmission 3 also connected to drive wheels 2 through a driveshaft 5 and a differential gear unit 6 etc.

The engine 1 serves as a prime mover of the vehicle Ve, and for example, an internal combustion engine such as a gasoline engine, a diesel engine, a natural gas engine and etc. may be used as the engine 1. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The transmission 3 is adapted to transmit torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the transmission 3. The vehicle Ve is further provided with a clutch 7 adapted to selectively allow a power transmission between the engine 1 and the drive wheels 2, irrespective of type of the transmission 3.

According to the example shown in FIG. 1, the belt-driven CVT is used as the transmission 3. Specifically, the transmission 3 includes a belt-driven transmission 8 and a torque reversing device 9 for reversing a direction of the torque transmitted to the drive wheels 2 between forward and backward directions. The torque reversing device 9 is comprised of a forward clutch engaged to establish the forward stage and a reverse clutch engaged to establish the reverse stage. Those forward and reverse clutches serve as a claimed clutch device 7. A gear stage of the transmission 3 is shifted between the forward stage and the reverse stage by selectively bringing the forward clutch or the reverse clutch into engagement. The transmission 3 is brought into neutral state where power transmission to/from the engine 1 is interrupted by bringing the clutch device 7 (i.e., both forward and reverse clutches) into disengagement.

The clutch device 7 is adapted to selectively allow and interrupt torque transmission between the engine 1 and the transmission 4. To this end, for example, a friction clutch or a multiple disc clutch whose torque transmitting capacity is controlled hydraulically may be used as the clutch device 7.

Conventional geared AT is comprised of a plurality of planetary gear units, a forward clutch engaged to establish the forward stage, a reverse clutch engaged to establish the reverse stage, and an optional clutch or brake for establishing an optional forward stage. Given that the geared AT thus structured is used as the transmission 3, the transmission 3 is brought into the neutral stage by bringing all of the forward and reverse clutches into disengagement. In this case, those forward clutch(es) and reverse clutch serve as the claimed clutch device.

Given that the DCT is used as the transmission 3, the power transmission between the engine 1 and the transmission 3 is interrupted by bringing both of the clutches of the DCT into disengagement. That is, the transmission 3 is brought into the neutral state. In this case, the two clutches of the DCT serve as the claimed clutch device.

Given that the AMT is used as the transmission 3, the power transmission between the engine 1 and the transmission 3 is interrupted by bringing a clutch disposed between a conventional manual transmission device and the engine 1 into disengagement. That is, the transmission 3 is brought into the neutral state. In this case, the above-explained clutch serves as the claimed clutch device.

A torque converter 4 is comprised of a pump impeller 4p rotated by the engine 1, a turbine runner 4t rotated by receiving a spiral oil flow created by the pump impeller 4p, and a stator 4s interposed between the pump impeller 4p and the turbine runner 4t. Here, the stator 9 is fixed to a predetermined fixing portion through a one-way clutch (not shown). Accordingly, the torque converter 4 has an ability to multiply torque within a converter range so that torque applied to the clutch device 7 is changed in accordance with a speed ratio or a torque ratio of the torque converter 4.

In order to hydraulically control the transmission 3 and the lockup clutch (not shown) of a torque converter 4, the vehicle Ve is provided with a hydraulic control unit 10. The hydraulic control unit is comprised of an oil pump and accumulator (both not shown) as hydraulic sources, and connected to the transmission 3, the clutch device 7, and the lockup clutch of the torque converter 4. Therefore, a speed change operation and a clamping pressure of the belt-driven transmission 8, actuation of the clutch device 7 and the lockup clutch and so on are controlled by hydraulic pressure established by the hydraulic control unit 10.

In order to electrically control the engine 1 and the hydraulic control unit 10, the vehicle Ve is provided with an electronic control unit (ECU) 11 as a microcomputer that is configured to carry out a calculation based on input data and preinstalled data, and to transmit a calculation result in the form of a command signal. For example, detection signals from an engine speed sensor 12 adapted to detect a speed Ne of the output shaft 1a of the engine 1, a turbine speed sensor 13 adapted to detect a speed Nt of the turbine runner 4t of the torque converter 4, an input speed sensor 14 adapted to detect a speed Nin of the input shaft 3a of the transmission 3, an accelerator sensor (or an accelerator switch) 15 adapted to detect a depression angle or a depression amount of an accelerator pedal, a brake sensor (or a brake switch) 16 adapted to detect a depression angle or a depression amount of a brake pedal, a wheel speed sensor, an oil temperature sensor and so on are sent to the ECU 11. Based on those signals, the ECU 11 sends a command signals to the engine 1 to control the operating condition, and to the hydraulic control unit 10 to control a speed change operation of the transmission 3 and actuation of the clutch device 7.

In order to reduce fuel consumption of the vehicle Ve thus structured, energy saving controls such as the stop and start control (i.e., the S & S control and the coasting control are applicable. Under the S & S control, specifically, the engine 1 is temporarily stopped while bringing the clutch device 7 into disengagement upon satisfaction of a predetermined stopping condition, and the engine 1 is restarted while bringing the clutch device 7 into engagement upon satisfaction of a predetermined starting condition. Under the coasting control, specifically, the vehicle Ve is coasted by bringing the clutch device 7 into disengagement upon satisfaction of a predetermined starting condition, and the coasting of the vehicle Ve is terminated by bringing the clutch device 7 into engagement upon satisfaction of a predetermined terminating condition. Thus, the energy saving controls are executed while controlling an engagement states of the clutch device 7.

The S & S control includes: a stop-based S & S control in which the engine 1 is automatically stopped based on a fact that the vehicle Ve is stopped; a deceleration-based S & S control in which the engine 1 is automatically stopped based on a fact that the vehicle is decelerated to be stopped by depressing a brake pedal while returning an accelerator pedal; and a free-run S & S control in which the engine 1 is automatically stopped based on a fact that the accelerator pedal is released at a vehicle speed higher than a predetermined speed.

Specifically, the stop-based S & S control is executed based on a fact that the brake pedal is depressed in the stopping vehicle. Under the stop-based S & S control, the engine 1 is restarted by releasing the brake pedal.

The deceleration-based S & S control is executed to stop the engine 1 based on a fact that the brake pedal is depressed while releasing the accelerator pedal at a vehicle speed lower than a predetermined speed. Under the deceleration-based S & S control, the engine 1 is restarted by releasing the brake pedal or depressing the accelerator pedal.

The free run S & S control is executed to stop the engine 1 based on a fact that the accelerator pedal is released at a vehicle speed higher than a predetermined speed. Under the free run S & S control the engine 1 is restarted by depressing the accelerator pedal.

When stopping the engine 1 during execution of any of the above-mentioned stop-based S & S control, the deceleration-based S & S control and the free run S & S control, vibrations and shocks would be caused by a torque change of the engine 1. In order to avoid propagation of vibrations caused by such torque change to the powertrain, the clutch device 7 is brought into disengagement prior to stopping the engine 1 by the S & S control to interrupt torque transmission between the engine 1 and the transmission 3 or the drive wheels 2. Likewise, such torque change is also caused when the engine 1 is restarted. Therefore, the clutch device 7 will be brought into engagement after restarting the engine 1. In this situation, a torque transmitting capacity of the clutch device 7 is gradually increased by bringing into engagement while slipping to reduce engagement shocks and to start or accelerate the vehicle without delay.

As described, according to the conventional art, such slip engagement of the clutch device is carried out based on a target turbine speed of the torque converter. However, in the vehicle running at a predetermined speed, the input speed to the transmission should be higher than the target turbine speed and hence the clutch may be brought into engagement before the turbine speed is raised sufficiently. In this situation, shocks resulting from starting the engine may propagate to the powertrain to provide the driver with uncomfortable feeling.

Figure 9:
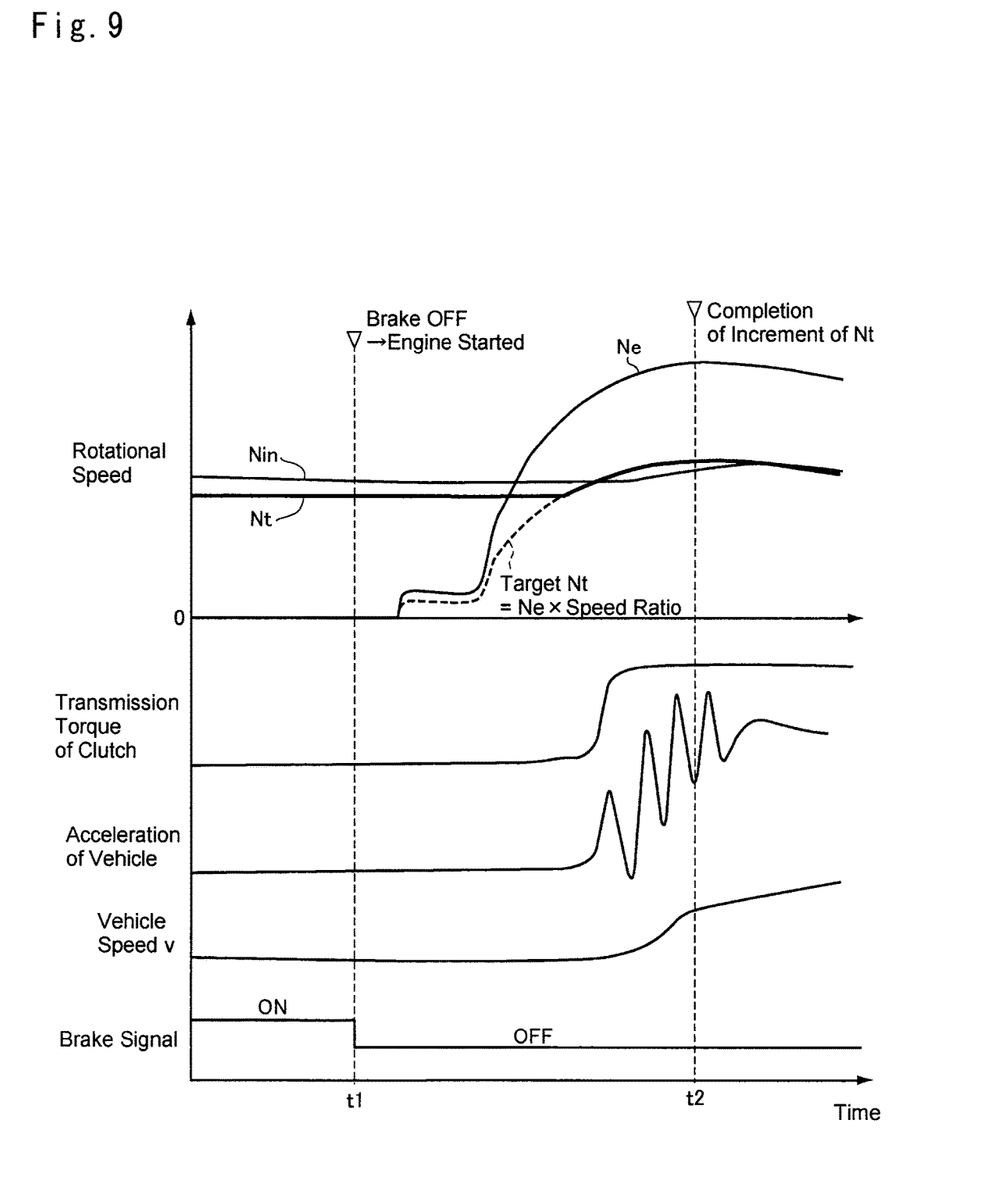
FIG. 9 is a time chart showing temporal changes in an engine speed, a turbine speed, an input speed, and a vehicle behavior during execution of the conventional control.

A state of the vehicle during execution of the conventional deceleration-based S & S control at a predetermined speed is illustrated in the time chart shown in FIG. 9. At point t1, a brake pedal is released so that the engine 1 is restarted. In this situation, a slip engagement of the clutch is carried out in a manner such that an actual turbine speed Nt is increased to achieve a target speed calculated by multiplying an engine speed Ne by a speed ratio of the torque converter. Then, a termination of an increment of the turbine speed Nt is determined at point t2 before the turbine speed Nt is increased sufficiently, and the clutch is brought into complete engagement. If the clutch is thus brought into engagement before the turbine speed Nt is increased sufficiently, a torque change resulting from starting the engine is transmitted to the powertrain to cause vibrations and shocks. Consequently, as can be seen from FIG. 9, an acceleration of the vehicle is fluctuated significantly around the point t2 and hence the driver feels shocks and uncomfortable feeling.

Thus, according to the conventional control, the clutch may be brought into engagement before the turbine speed Nt is increased properly during execution of the deceleration-based S & S control or the free run S & S control. Such engagement shocks resulting from insufficiency of the turbine speed Nt may also be caused during the coasting control in which the clutch is brought into disengagement to coast the vehicle. Therefore, conventional controls of those kinds are required to be improved.

According to the present invention, therefore, the control system is configured to properly carry out the deceleration-based S & S control and the free run S & S control as well as the coasting control in the running vehicle having the transmission 3 with the torque converter 4, without causing shocks and without providing uncomfortable feeling with the driver.

First Example

Figure 2:
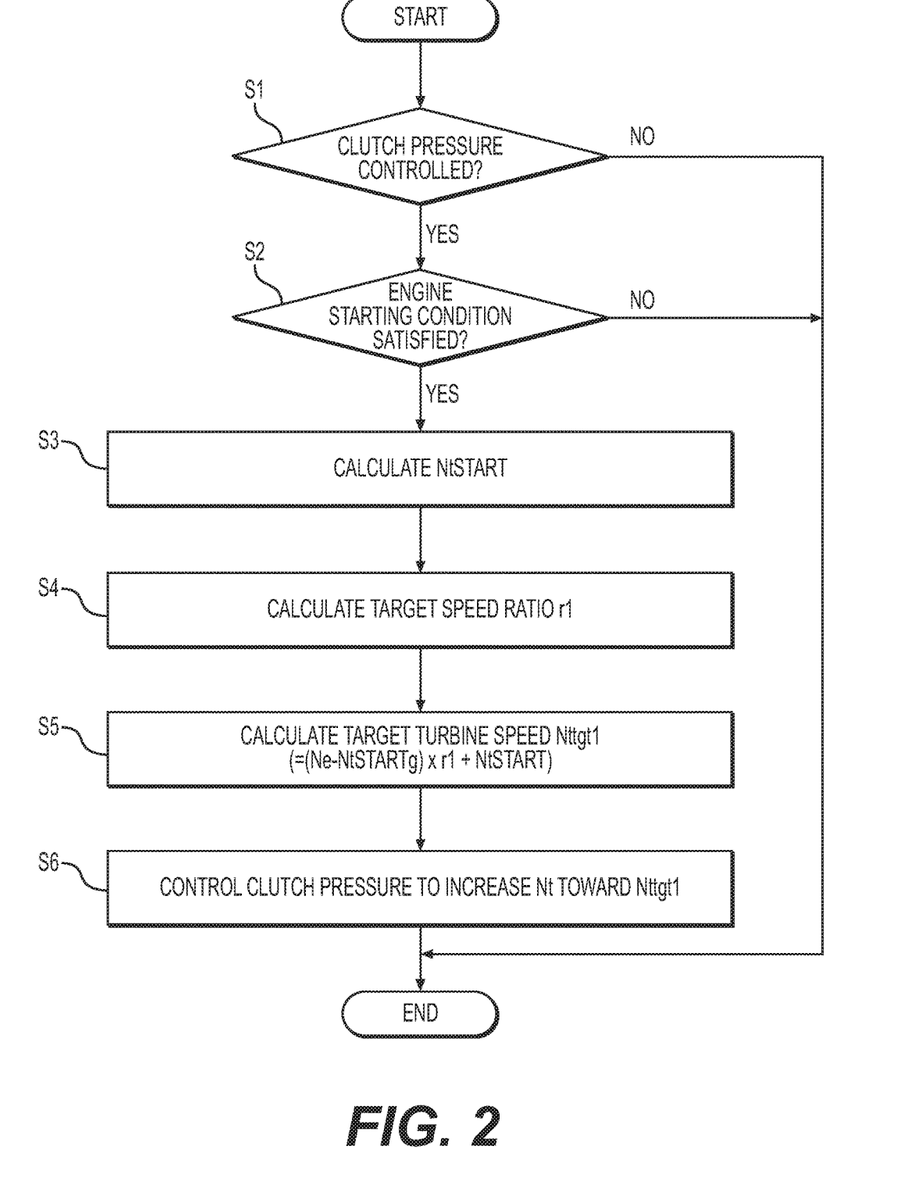
FIG. 2 is a flowchart showing a first control example according to the present invention.

A first control example according to the present invention will now be explained with reference to the flowchart shown in FIG. 2. The routine shown in the FIG. 2 is executed during stopping the engine 1 by the S & S control, and repeated at predetermined short intervals. First of all, it is determined whether or not a pressure applied to the clutch device 7 is under control (at step S1). Specifically, if the clutch device 7 is in disengagement during the S & S control or gradually brought into engagement to start the engine 1, the pressure applied to the clutch device 7 is under control so that the answer of step S1 will be YES in those cases. By contrast, if the clutch device 7 is in complete engagement after the termination of the S & S control, the pressure applied to the clutch device 7 does not have to be controlled so that the answer of step S1 will be NO. In addition, the pressure applied to the clutch device 7 is also not necessary to be controlled if a shift position of the transmission 3 is in parking position or neutral position. Therefore, the answer of step S1 will also be NO in those cases.

If the answer of step S1 is NO, the routine is ended without carrying out subsequent controls. By contrast, if the answer of step S1 is YES, the routine advances to step S2 to determine whether or not a decision to restart the engine 1 has been made. As described, under the S & S control, the engine 1 is restarted upon satisfaction of a predetermined condition. In other words, the engine 1 is restarted upon dissatisfaction of the predetermined condition. At step S2, therefore, satisfaction of the starting condition of the engine 1 is confirmed.

If the decision to restart the engine 1 has not yet been made so that the answer of step S2 is NO, the routine is ended without carrying out subsequent controls. By contrast, if the decision to restart the engine 1 has been made so that the answer of step S2 is YES, the routine advances to step S3 to calculate a turbine speed Ntstart. Specifically, the turbine speed Ntstart calculated at step S3 is a turbine speed Nt at a timing when a speed of the turbine runner 4t starts to be increased by a torque multiplication of the torque converter 4 resulting from an increment of a speed of the pump impeller 4p associated with an increment of the engine speed Ne when starting the engine 1.

Then, a target speed ratio r1 is calculated (at step S4) to determine an increasing amount of the turbine speed Nt being increased. For example, the target speed ratio r1 may be determined in the form of a map using a vehicle speed and an oil temperature as parameters. Here, the target speed ratio r1 may be adjusted in accordance with a grade of the vehicle Ve and the driving mode.

Then, a target turbine speed Nttgt1 is calculated (at step S5). At step S5, specifically, the target turbine speed Nttgt1 is calculated based on the engine speed Ne, the turbine speed Ntstart calculated at step S3, and the target speed ratio r1 calculated at step S4, as expressed by the following expression:

$$Nttgt1 = (Ne - Ntstart) \cdot r1 + Ntstart.$$

Then, an engagement pressure applied to the clutch device 7 is controlled at step S6 in a manner such that an actual turbine speed Nt is increased to achieve the target turbine speed Nttgt1 calculated at step S5. That is, a feedback control of the turbine speed Nt is carried out based on the target turbine speed Nttgt1. Then, the routine is ended.

Figure 3:
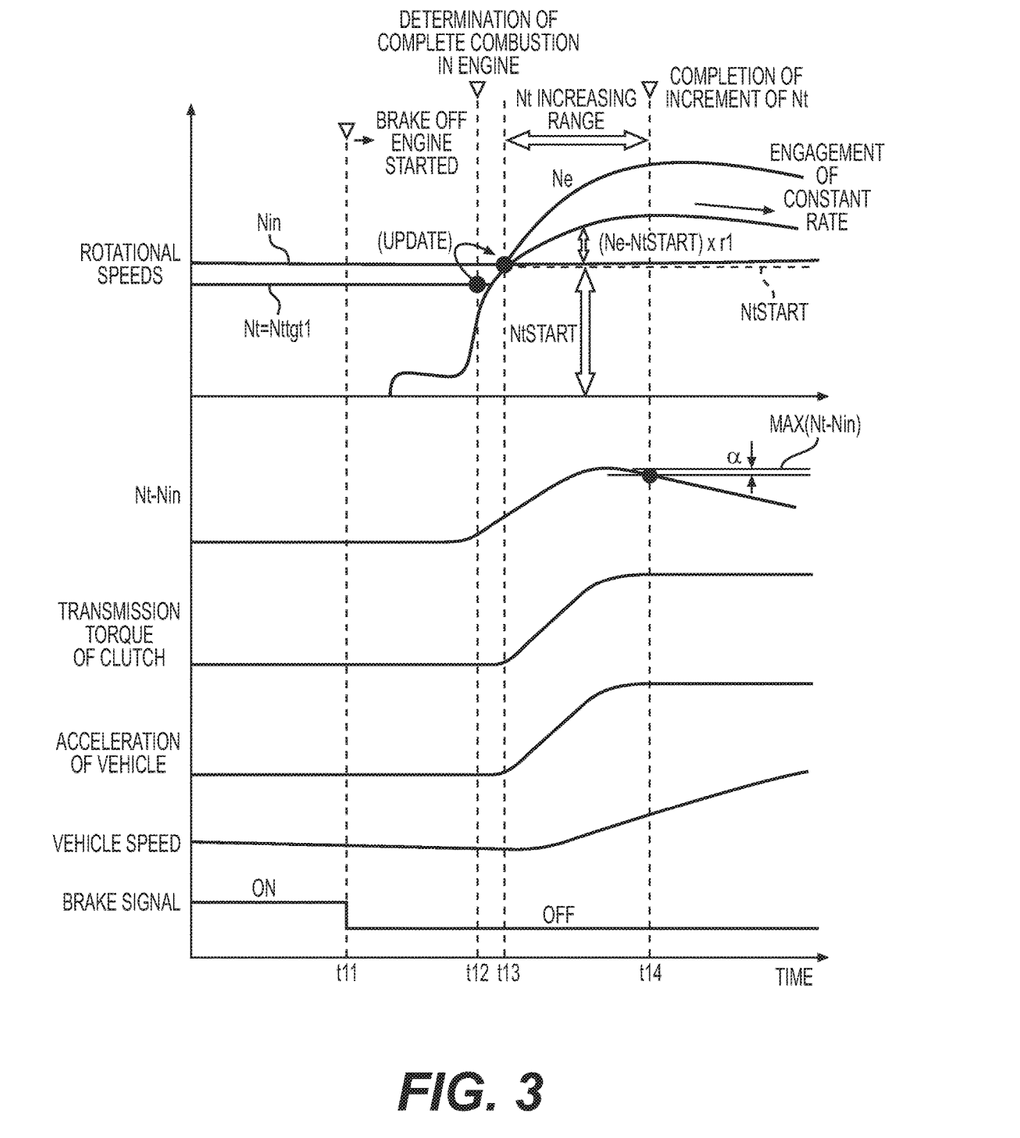
FIG. 3 is a time chart showing temporal changes in an engine speed, a turbine speed, an input speed, and a vehicle behavior during execution of the first control example shown in FIG. 2.

Temporal changes in the parameters of the vehicle Ve during execution of the first control example shown in FIG. 1 will be explained with reference to the time chart shown in FIG. 3. Before point t11, the brake pedal is depressed so that the deceleration-based S & S control is carried out to stop the engine 1. When the brake pedal is released so that the starting condition of the engine 1 is satisfied at the point t11, the engine 1 is restarted. Then, a complete combustion in the engine 1, that is, an achievement of a self-sustaining condition of the engine 1 is determined at point t12. To this end, the engine 1 is restarted by rotating the crankshaft by a starter motor while supplying fuel until number of rotations of the crankshaft reaches a predetermined number. Therefore, the complete combustion in the engine 1 can be determined when the number of rotations of the engine 1 being restarted reaches a predetermined number determined based on a displacement and a type of the engine 1.

When the complete combustion in the engine 1 is determined at the point t12, a turbine speed Nt at this point is employed as a tentative target turbine speed Nttgt1. As explained later, the target turbine speed Nttgt1 is updated when the turbine speed Nt is raised to be higher than an input speed Nin to the transmission 3. Therefore, the turbine speed Nt at this point is employed as the tentative target turbine speed Nttgt1. However, the turbine speed Nt will not always be raised to be higher than the input speed Nin. If the turbine speed Nt is not raised to be higher than the input speed Nin, the subsequent controls are carried out based on the target turbine speed Nttgt1 determined at the point t12.

When the turbine speed Nt being raised with an increment of the engine speed Ne exceeds the input speed Nin at point t13, the turbine speed Nt at this point is employed as the turbine speed Ntstart. At the point t13, the target turbine speed Nttgt1 is calculated again based on the turbine speed Ntstart and the target turbine speed Nttgt1 determined at the point t12 is updated to the newly calculated value.

When the target turbine speed Nttgt1 is updated at the point t13, the clutch device 7 is gradually brought into engagement while slipping in a manner such that the actual turbine speed Nt is raised to the updated target turbine speed Nttgt1.

Then, when a maximum value Max (Nt−Nin) calculated by subtracting the input speed Nin from the turbine speed Nt is reduced in an amount larger than a threshold value α at point t14, a completion of an increment of the turbine speed Nt is determined. After the completion of the increment of the turbine speed Nt, the turbine speed Nt being raised is reduced toward the input speed Nin at a predetermined constant lowering rate determined in a manner such that the clutch device 7 can be brought into engagement as soon as possible without causing engagement shocks. Then, when the turbine speed Nt reaches the input speed Nin, the increment of the turbine speed Nt and the slip engagement of the clutch device 7 are completed.

Thus, according to the first control example, the clutch device 7 is brought into engagement while properly controlling an amount of increment of the turbine speed Nt when restarting the engine 1 under the S & S control. According to the first control example, therefore, a change in the output torque of the engine 1 resulting from starting the engine 1 will not propagate to the transmission 3 and the drive wheels 2 through the torque converter 4 and the clutch device 7. For this reason, the S & S control can be carried out without causing engagement shocks of the clutch device 7 and without providing uncomfortable feeling with the driver.

Second Example

Thus, according to the first control example, the target turbine speed Nttgt1 is determined and the clutch device 7 is brought into engagement while slipping. In this case, if the target turbine speed Nttgt1 continuously falls below the input speed Nin, the engagement of the clutch device 7 will not be completed. For example, according to the example shown in FIG. 4, the coasting control is terminated when the accelerator pedal is depressed at point t21. At the same time, the engagement control of the clutch device 7 in disengagement during the coasting is commenced.

Figure 4:
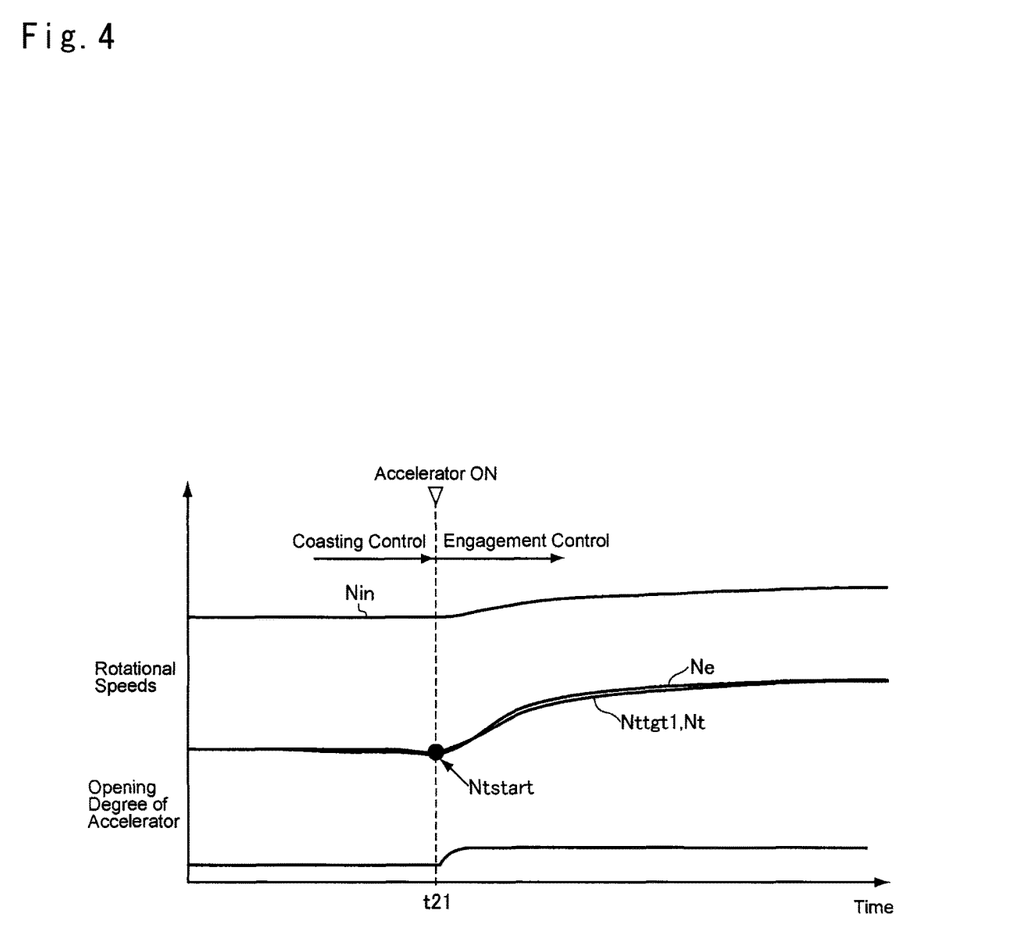
FIG. 4 is a time chart showing a situation in which the turbine speed is not raised to the input speed and hence an engagement of the clutch device cannot be completed.

In this case, although the accelerator pedal is depressed, the accelerator is not opened widely, and the input speed Nin is slightly increased with an increment of the vehicle speed. In this situation, since an opening degree of the accelerator is small, the engine speed Ne is not increased significantly. Therefore, the engine speed Ne is continuously kept to be lower than the input speed Nin after the point t21. Such situation is continued until the accelerator pedal is depressed deeper than before to increase the engine speed Ne, or until the vehicle speed is lowered so that the input speed Nin drops.

Theoretically, the turbine speed Nt will not exceed the engine speed Ne, and hence the target turbine speed Nttgt1 is kept to be lower than the input speed Nin as long as the engine speed Ne falls below the input speed Nin. In this situation, therefore, the clutch device 7 is kept in partial engagement while slipping. If such slippage of the clutch device 7 takes place over a long period of time, the clutch device 7 would be damaged.

In order to avoid such a disadvantage, according to the second control example, the target turbine speed Nttgt1 is altered to compulsory bring the clutch device 7 into engagement if the difference between the input speed Nin and the turbine speed Nt remains constant over a predetermined period of time. Details of the second control example are shown in FIG. 5, and detailed explanations for the steps in common with those of the first control example will be omitted.

Figure 5:
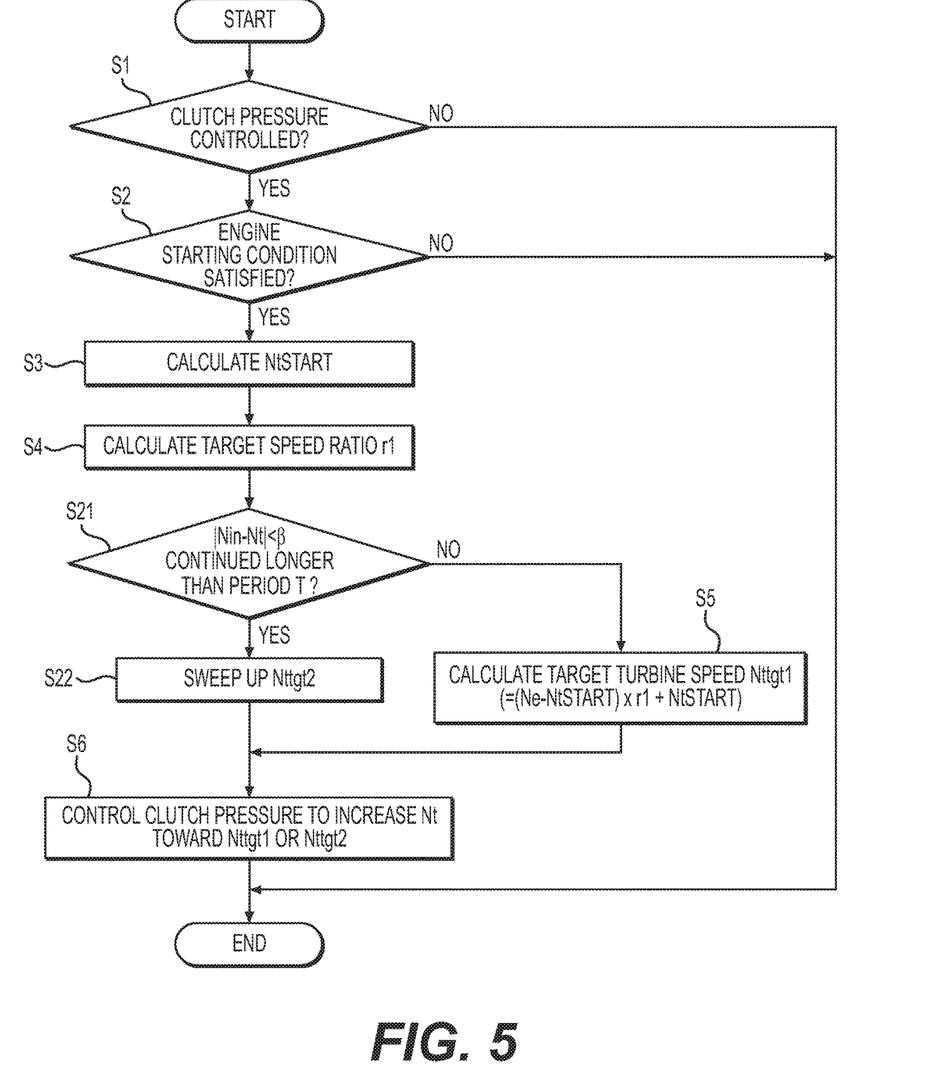
FIG. 5 is a flowchart showing a second control example according to the present invention.

According to the second example shown in FIG. 5, the target speed ratio r1 is calculated at step S4. Then, it is determined whether or not an absolute value |Nin−Nt| is kept to be smaller than a threshold value β for a predetermined period of time T or longer (at step S21). To this end, the threshold value β and the period T are determined in advance based on a result of simulation or experimentation. If the absolute value |Nin−Nt| is still larger than the threshold value β, or if a condition in which the absolute value |Nin−Nt| is smaller than the threshold value β has not yet continued longer than the period T so that the answer of step S21 is NO, the routine advances to step S5 to calculate the target turbine speed Nttgt1. Then, as the first control example, an engagement pressure applied to the clutch device 7 is controlled at step S6 in a manner such that the actual turbine speed Nt is increased to achieve the target turbine speed Nttgt1 calculated at step S5.

By contrast, if the absolute value |Nin−Nt| is kept to be smaller than a threshold value β for the period T or longer so that the answer of step S21 is YES, the routine advances to step S22 to sweep up a target turbine speed Nttgt toward the input speed Nin. That is, the target turbine speed Nttgt2 is set in a manner such that the turbine speed Nt is increased to the input speed Nin. Then, an engagement pressure applied to the clutch device 7 is controlled at step S6 in a manner such that the actual turbine speed Nt is raised to achieve the target turbine speed Nttgt2 set at step S22. Specifically, the slip engagement of the clutch device 7 is carried out to compulsory raise the turbine speed Nt to the input speed Nin.

Temporal changes in the parameters of the vehicle Ve during execution of the second control example shown in FIG. 2 will be explained with reference to the time chart shown in FIG. 3. During coasting the vehicle Ve, the accelerator pedal is depressed at point t21 so that the coasting is terminated. At this point, the clutch device 7 in disengagement starts to be brought into engagement. Then, when the absolute value |Nin−Nt| is reduced to be smaller than the threshold value β, a time duration in which the absolute value |Nin−Nt| is smaller than the threshold value β is measured. Then, when the time duration in which the absolute value |Nin−Nt| is smaller than the threshold value β exceeds the predetermined period of time T at point t23, the target turbine speed Nttgt for increasing the turbine speed Nt toward the input speed Nin is altered from Nttgt1 to Nttgt2.

Figure 6:
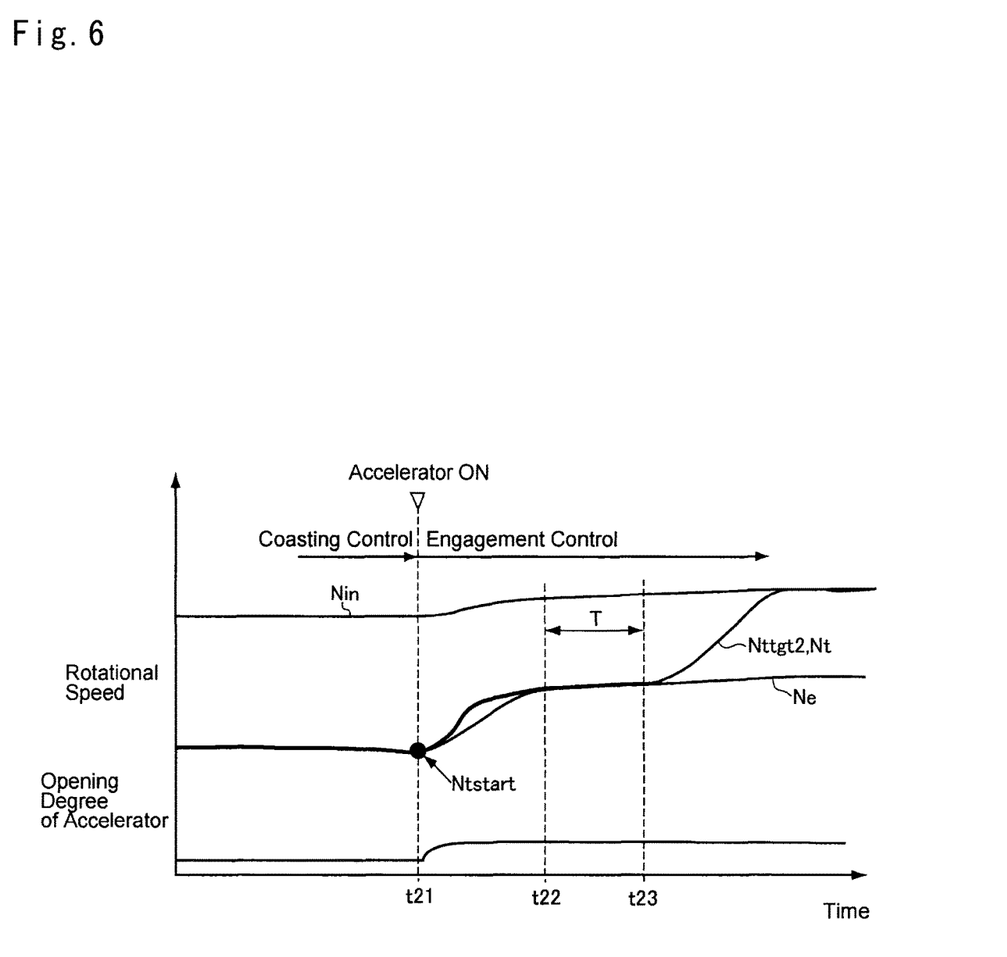
FIG. 6 is a time chart showing temporal changes in an engine speed, a turbine speed, an input speed, and a vehicle behavior during execution of the second control example shown in FIG. 5.

When the target turbine speed is thus set to Nttgt2, the engagement pressure applied to the clutch device 7 is controlled in a manner such that the actual turbine speed Nt is increased to the target turbine speed Nttgt2, and the slip engagement of the clutch device 7 is terminated.

Thus, according to the second control example, the clutch device 7 is compulsory brought into engagement if the difference between the input speed Nin and the turbine speed Nt is not reduced over the time period T during the coasting or the S & S control. Specifically, the clutch device 7 is compulsory brought into engagement while slipping in a manner such that the turbine speed Nt is raised compulsory to the input speed Nin. According to the second control example, therefore, the time duration in which the turbine speed Nt is not raised to the input speed Nin will not be continued over a long period of time. For this reason, the partial engagement of the clutch device 7 while slipping will not be continued over a long period of time so that the clutch device 7 can be prevented from being damaged.

Third Example

As described, according to the second control example, the turbine speed Nt is compulsory raised to the input speed Nin by bringing the clutch device 7 into engagement if the difference between the input speed Nin and the turbine speed Nt is not reduced over the time period T. In this case, it is preferable to bring the clutch device 7 into engagement as quick as possible in order to reduce friction of the clutch device 7 and in order not to slow acceleration response of the vehicle Ve.

For these purposes, according to the third control example, the turbine speed Nt is immediately raised to the input speed Nin if the input speed Nin is higher than the turbine speed Nt. Details of the third control example are shown in FIG. 7, and detailed explanations for the steps in common with those of the foregoing control examples will be omitted.

Figure 7:
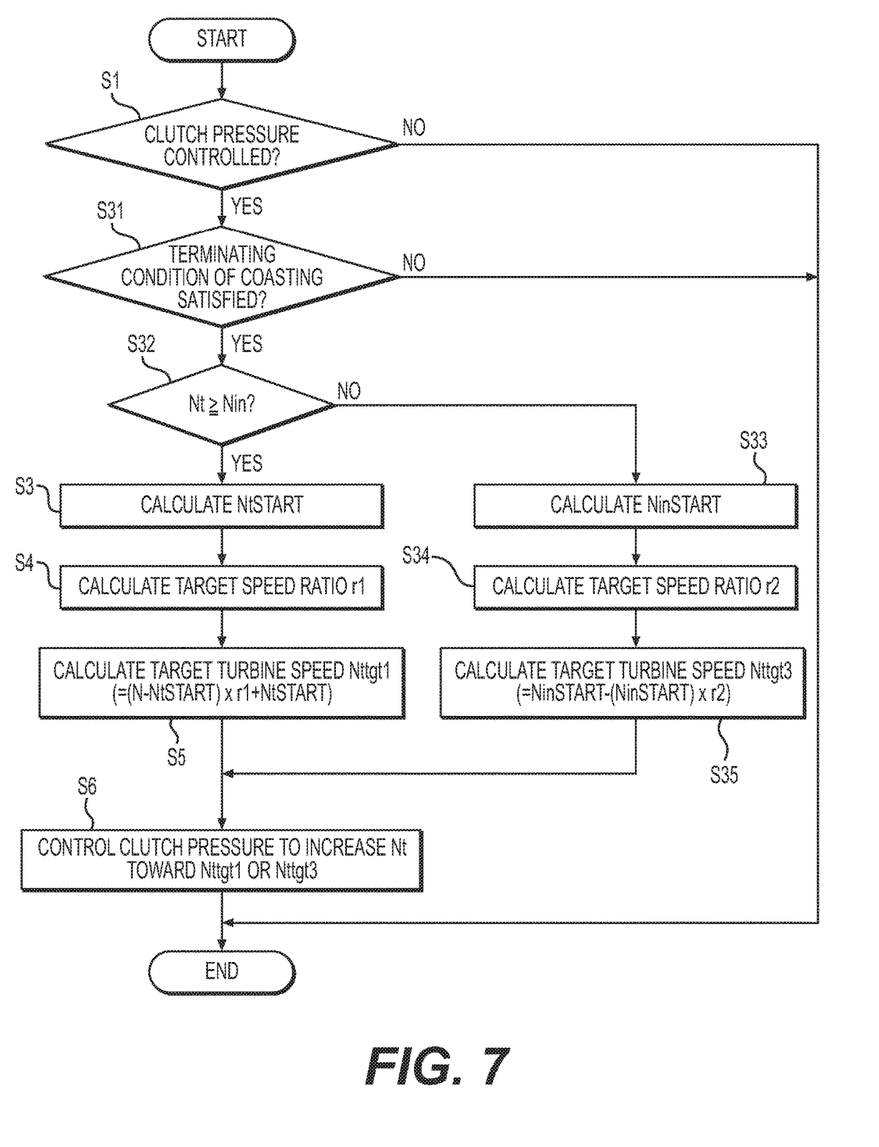
FIG. 7 is a flowchart showing a third control example according to the present invention.

According to the third control example shown in FIG. 7, if the clutch device 7 is in disengagement or gradually brought into engagement 1 so that the answer of step S1 is YES, the routine advances to step S31 to determine whether or not a terminating condition of the coasting is satisfied. As the S & S control, the clutch device 7 is brought into disengagement to disconnect the engine 1 from the powertrain upon satisfaction of the predetermined starting condition of the coasting. Likewise, the coasting is terminated upon satisfaction of the predetermined restarting condition of the engine 1. At step S31, therefore, a satisfaction of the restarting condition of the engine 1 is determined. For example, it is determined at step S31 whether or not the accelerator pedal is depressed during the coasting.

If the terminating condition of the coasting has not yet been satisfied so that the answer off step S31 is NO, the routine is ended without carrying out subsequent controls. By contrast, if the terminating condition of the coasting has been satisfied so that the answer off step S31 is YES, the routine advances to step S32 to determine whether or not the turbine speed Nt is higher than the input speed Nin. If the turbine speed Nt is higher than the input speed Nin so that the answer off step S32 is YES, the routine advances to step S3 to sequentially carry out the controls from steps S3 to S6 as the first control examples.

By contrast, if the turbine speed Nt is lower than the input speed Nin so that the answer off step S32 is NO, the routine advances to step S33 to calculate the turbine speed Ninstart. Specifically, the turbine speed Ninstart calculated at step S33 is an input speed Nin at a timing when the terminating condition of the coasting is satisfied so that the clutch device 7 is brought into engagement.

Then, a target speed ratio r2 is calculated (at step S34). Specifically, the target speed ratio r2 is used to set a below-mentioned target turbine speed Nttgt3 in a manner such that the turbine speed Nt can be increased promptly to the input speed Nin. As the aforementioned target speed ratio r1, the target speed ratio r2 may also be determined in the form of a map using a vehicle speed and an oil temperature as parameters, and may be adjusted in accordance with a grade of the vehicle Ve and the driving mode.

Then, the target turbine speed Nttgt3 is calculated (at step S35). At step S35, specifically, the target turbine speed Nttgt3 is calculated based on the engine speed Ne, the turbine speed Ninstart calculated at step S33, and the target speed ratio r3 calculated at step S34, as expressed by the following expression:

$Nttg3=Ninstart-(Ninstart-Ne) \cdot r1$.

Then, an engagement pressure applied to the clutch device 7 is controlled at step S6 in a manner such that an actual turbine speed Nt is changed to achieve the target turbine speed Nttgt3 calculated at step S35. That is, a feedback control of the turbine speed Nt is carried out based on the target turbine speed Nttgt3. Then, the routine is ended.

Figure 8:
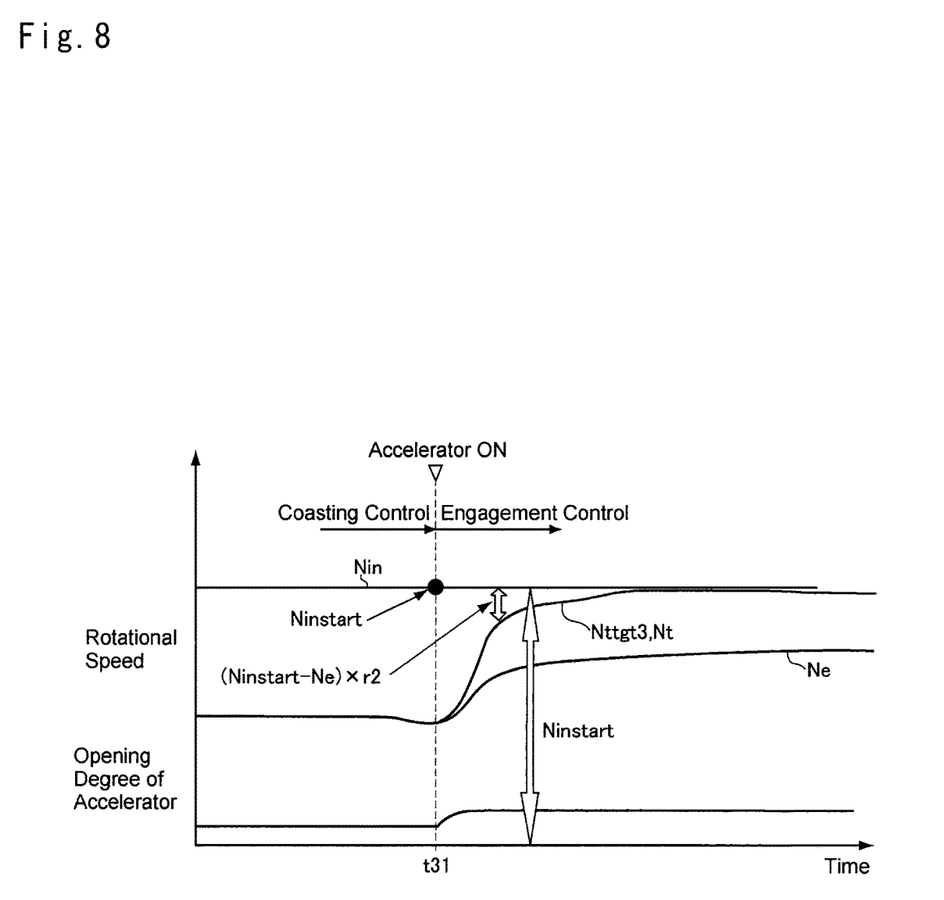
FIG. 8 is a time chart showing temporal changes in an engine speed, a turbine speed, an input speed, and a vehicle behavior during execution of the second control example shown in FIG. 5.

Temporal changes in the parameters of the vehicle Ve during execution of the third control example shown in FIG. 7 will be explained with reference to the time chart shown in FIG. 8. During coasting the vehicle Ve, the accelerator pedal is depressed at point t31 so that the coasting is terminated. At this point, the clutch device 7 in disengagement starts to be brought into engagement. At this point, if the input speed Nin is higher than the turbine speed Nt, the target turbine speed Nttgt3 is set in a manner such that the turbine speed Nt can be increased promptly to the input speed Nin.

When the target turbine speed is thus set to Nttgt3, the engagement pressure applied to the clutch device 7 is controlled in a manner such that the actual turbine speed Nt is increased to the target turbine speed Nttgt3, and the slip engagement of the clutch device 7 is terminated.

Thus, according to the third control example, the clutch device 7 is compulsory brought into engagement if the input speed is too high and hence the difference between the input speed Nin and the turbine speed Nt cannot be reduced during the coasting or the S & S control. Specifically, the clutch device 7 is promptly brought into engagement while slipping in a manner such that the turbine speed Nt is raised compulsory to the input speed Nin. According to the third control example, therefore, the time duration in which the turbine speed Nt is not raised to the input speed Nin will not be continued over a long period of time. For this reason, the partial engagement of the clutch device 7 while slipping will not be continued over a long period of time so that the clutch device 7 can be prevented from being damaged.

As described, the vehicle control system of the present invention is applied to the vehicle Ve having the torque converter 4 disposed between the engine 1 and the transmission 3, and the clutch device 7 disposed between the torque converter 4. During execution of the energy saving control such as the S & S control and the coasting control, the vehicle control system brings the clutch device 7 into engagement while increasing a torque transmitting capacity thereof using an increasing amount of the turbine speed Nt of the turbine runner 4t as a target value. That is, the vehicle control system brings the clutch device 7 into engagement while slipping. According to the present invention, therefore, an engagement shock of the clutch device 7 and a resultant change in the output torque of the engine 1 will not be transmitted to the transmission 3 and the drive wheels 2 through the torque converter 4 and the clutch device 7. For this reason, the S & S control and the coasting control can be carried out without providing uncomfortable feeling with the driver.

The invention claimed is:

1. A vehicle control system that is applied to a vehicle including an engine, a torque converter including a pump impeller to which torque of the engine is delivered, and a turbine runner from which the torque is outputted, a transmission that transmits the torque delivered from the turbine runner to drive wheels, and a clutch device that is disposed between the turbine runner and the transmission to selectively connect the torque converter to the transmission while changing a torque transmitting capacity thereof, comprising:
    a control unit configured to execute an energy saving control for reducing energy consumption of the vehicle by automatically controlling an operating condition of the engine and an engagement condition of the clutch device to stop the engine during running while bringing the clutch device into disengagement,
    wherein the control unit is configured to increase a speed of the turbine runner using an increasing amount thereof as a target value when restarting the engine while bringing the clutch device into engagement, being in disengagement during execution of the energy saving control, and to complete the engagement of the clutch device after a completion of an increment of the speed of the turbine runner.

2. The vehicle control system according to claim wherein the control unit is further configured to calculate the target value of the speed of the turbine runner using an expression:

$$Nttgt = (Ne - Ntstart) \cdot r + Ntstart;$$

where Nttgt is the target value of the speed of the turbine runner, Ne is a speed of the engine, Ntstart is the speed of the turbine runner, and r is a constant.

3. The vehicle control system according to claim 1, wherein the control unit is further configured to determine the completion of the increment of the speed of the turbine runner when a maximum value calculated by subtracting the input speed to the transmission from the speed of the turbine runner is reduced in an amount larger than a threshold value.

4. The vehicle control system according to claim 2, wherein the control unit is further configured to determine the completion of the increment of the speed of the turbine runner when a maximum value calculated by subtracting the input speed to the transmission from the speed of the turbine runner is reduced in an amount larger than a threshold value.

* * * * *

UNITED STATES PATENT AND TRADEMARK OFFICE
CERTIFICATE OF CORRECTION

PATENT NO.        : 9,707,969 B2
APPLICATION NO.   : 14/438355
DATED             : July 18, 2017
INVENTOR(S)       : Satoshi Yamanaka et al.

It is certified that error appears in the above-identified patent and that said Letters Patent is hereby corrected as shown below:

In the Claims

Column 15, Line 1, insert --1,-- before "wherein".

Signed and Sealed this
Tenth Day of April, 2018

Andrei Iancu
*Director of the United States Patent and Trademark Office*